United States Patent
Lin

(10) Patent No.: US 12,210,126 B2
(45) Date of Patent: *Jan. 28, 2025

(54) SOLID-STATE LIGHT DETECTION AND RANGING (LIDAR) SYSTEM WITH REAL-TIME SELF-CALIBRATION

(71) Applicant: Aurora Operations, Inc., Pittsburgh, PA (US)

(72) Inventor: Sen Lin, Santa Clara, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 1087 days.

This patent is subject to a terminal disclaimer.

(21) Appl. No.: 17/113,218

(22) Filed: Dec. 7, 2020

(65) Prior Publication Data

US 2021/0116551 A1    Apr. 22, 2021

Related U.S. Application Data

(63) Continuation of application No. 16/616,095, filed as application No. PCT/US2018/034361 on May 24, 2018, now Pat. No. 10,859,683.

(Continued)

(51) Int. Cl.
*G01S 7/497* (2006.01)
*G01S 7/481* (2006.01)
(Continued)

(52) U.S. Cl.
CPC ............ *G01S 7/497* (2013.01); *G01S 7/4818* (2013.01); *G01S 7/4913* (2013.01); *G01S 7/4915* (2013.01)

(58) Field of Classification Search
CPC ...... G01S 7/497; G01S 7/4913; G01S 7/4915; G01S 17/42; G01S 17/89; G01S 17/003;
(Continued)

(56) References Cited

U.S. PATENT DOCUMENTS 5,072,228 A   12/1991   Kuwahara
8,406,635 B2   3/2013   Nakashima et al.
(Continued)

FOREIGN PATENT DOCUMENTS

JP    2009246673 A1    10/2009
WO    2018218003 A1    11/2018

OTHER PUBLICATIONS

Tin Komljenovic and Paolo Pintus, "On-chip calibration and control of optical phased arrays," Opt. Express 26, 3199-3210 (2018) (Year: 2018).*

(Continued)

*Primary Examiner* — Isam A Alsomiri
*Assistant Examiner* — Joseph C Fritchman
(74) *Attorney, Agent, or Firm* — Dority & Manning, P.A.

(57) ABSTRACT

A light detection and ranging system. The system includes a solid-state optical antenna array, a phase monitor array, a phase controller, a plurality of phase shifters and a global phase shifter. The phase monitor array is configured to output a first mixed signal associated with one of the optical antenna subarrays, and a second mixed signal associated with two of the optical antenna subarrays. The phase controller is configured to output a first phase coefficient based on the first mixed signal and a second phase coefficient based on the second mixed signal. One of the phase shifters is configured to apply the first phase coefficient to compensate for temperature variation within one of the optical antenna subarrays. The global phase shifter is configured to apply the second phase coefficient to compensate for temperature variation between two of the optical antenna subarrays.

20 Claims, 7 Drawing Sheets

Related U.S. Application Data

(60) Provisional application No. 62/532,814, filed on Jul. 14, 2017, provisional application No. 62/511,287, filed on May 25, 2017, provisional application No. 62/511,288, filed on May 25, 2017, provisional application No. 62/511,285, filed on May 25, 2017.

(51) Int. Cl.
    *G01S 7/4913*      (2020.01)
    *G01S 7/4915*      (2020.01)

(58) Field of Classification Search
CPC .......... G01S 17/58; G01S 17/95; G01S 3/784; G01S 3/786; G01J 3/42
See application file for complete search history.

(56) References Cited

U.S. PATENT DOCUMENTS

| | | |
|---|---|---|
| 10,859,683 B2 | 12/2020 | Lin |
| 2008/0253713 A1 | 10/2008 | Piede et al. |
| 2010/0189445 A1 | 7/2010 | Nakashima et al. |
| 2012/0082072 A1 | 4/2012 | Shen |
| 2013/0322892 A1 | 12/2013 | Aflatouni et al. |
| 2015/0346340 A1 | 12/2015 | Yaacobi et al. |
| 2016/0329631 A1 | 11/2016 | Rheinfelder et al. |
| 2018/0039153 A1* | 2/2018 | Hashemi ............... G02F 1/2955 |
| 2018/0039154 A1 | 2/2018 | Hashemi et al. |
| 2018/0059248 A1 | 3/2018 | O'Keeffe |
| 2018/0107091 A1 | 4/2018 | Hosseini et al. |
| 2018/0175501 A1 | 6/2018 | Byun et al. |

OTHER PUBLICATIONS

International Search Report and Written Opinion of the International Searching Authority for International Application No. PCT/US2018/034361 dated Aug. 10, 2018.

International Preliminary Report on Patentability of the International Searching Authority for International Application No. PCT/US2018/034361 dated Dec. 5, 2019.

\* cited by examiner

SOLID-STATE LIGHT DETECTION AND RANGING (LIDAR) SYSTEM WITH REAL-TIME SELF-CALIBRATION

CROSS-REFERENCE TO RELATED APPLICATIONS

This application claims the benefit under 35 U.S.C. § 120 of the earlier filing date of U.S. patent application Ser. No. 16/616,095 titled SOLID-STATE LIGHT DETECTION AND RANGING (LIDAR) SYSTEM WITH REAL-TIME SELF-CALIBRATION, filed Nov. 22, 2019 (now allowed), which is a U.S. National Stage entry under 35 U.S.C. § 371 of International Application No. PCT/US18/34361 titled SOLID-STATE LIGHT DETECTION AND RANGING (LIDAR) SYSTEM WITH REAL-TIME SELF-CALIBRATION, filed May 24, 2018, which claims priority to and the benefit of U.S. Provisional Application No. 62/511,287, titled SOLID-STATE LIGHT DETECTION AND RANGING (LIDAR) SYSTEM WITH REAL-TIME SELF-CALIBRATION, filed May 25, 2017; U.S. Provisional Application No. 62/511,285, titled MICROPROCESSOR-ASSISTED SOLID-STATE LIGHT DETECTION AND RANGING (LIDAR) CALIBRATION, filed May 25, 2017; U.S. Provisional Application No. 62/511,288, titled ADAPTIVE ZOOMING IN SOLID-STATE LIGHT DETECTION AND RANGING (LIDAR) SYSTEM USING OPTICAL PHASED ARRAY, filed May 25, 2017; and U.S. Provisional Application No. 62/532,814, titled SOLID-STATE LIGHT DETECTION AND RANGING SYSTEM BASED ON AN OPTICAL PHASED ARRAY WITH AN OPTICAL POWER DISTRIBUTION NETWORK, filed Jul. 14, 2017, the entire contents of each of which are incorporated herein by reference and relied upon.

BACKGROUND

The present disclosure is in the technical field of solid-state LIDAR.

Generally, LIDAR, which stands for Light Detection and Ranging, is a remote sensing method that uses a laser to measure ranges or distances to a target object. Generally, a laser generates an intense beam of coherent monochromatic light, or other electromagnetic radiation, by stimulating the emission of photons from excited atoms or molecules. LIDAR typically measures distance to a target by illuminating the target with the laser and measuring the reflected signals with a sensor. Differences in laser return time and frequency may be gathered to generate precise, three-dimensional representations regarding the shape and surface characteristics of the target.

Typically, LIDAR uses ultraviolet, visible, or near infrared light to image objects. It may target a wide range of materials, including metal or non-metal objects, rocks, rain, chemical compounds, aerosols, clouds, etc. Further, a laser beam may be capable of mapping physical features with very high resolutions.

SUMMARY

The present disclosure provides new and innovative methods and systems for a solid-state light detection and ranging (LIDAR) system with real-time self-calibration. An example method includes a splitter dividing laser energy into divided laser energy. An optical phased array (OPA) receives the divided laser energy, where the OPA includes at least two antennas, such as a first antenna and a second antenna that both receive the divided laser energy. The first antenna outputs a first signal and the second antenna outputs a second signal. The first signal and second signal are mixed producing a mixed signal. A phase coefficient of an on-chip phase shifter is set based on the mixed signal.

An alternate example method includes a splitter dividing laser energy into divided laser energy. An OPA receives the divided laser energy, where the OPA includes at least two antenna sub-arrays, such as a first antenna sub-array including a first antenna and a second antenna sub-array that includes a second antenna. The first antenna outputs a first signal and the second antenna outputs a second signal. The first signal and second signal are mixed producing a sub-array mixed signal. A phase coefficient of a global phase shifter is set based on the sub-array mixed signal.

An example system includes a coupler that receives power from a power source, and a waveguide connected to the coupler at a first end of the waveguide. A splitter is connected to a second end of the waveguide to receive the power traveling through the waveguide, and the splitter divides the power between a plurality of outputs creating divided power. A global phase shifter is connected to a first output of the plurality of outputs of the splitter, and the global phase shifter receives the divided power. An on-chip splitter is connected to the global phase shifter and further divides the divided power into sub-divided power. An on-chip phase shifter is connected to the on-chip splitter. An OPA is connected to the on-chip splitter. A phase monitor array is connected to the OPA, and a phase controller is connected to the phase monitor array.

Additional features and advantages of the disclosed methods and system are described in, and will be apparent from, the following Detailed Description and the Figures.

DETAILED DESCRIPTION

Generally, conventional LIDAR systems employ mechanical moving parts to steer a laser beam. They are generally considered bulky, incredibly costly and unreliable for many applications. These mechanical moving parts typically are the largest and most expensive part of a laser-scanning system. Generally, solid-state LIDAR systems can overcome these issues by eliminating moving and mechanical parts. For example, by using the same manufacturing technology as silicon microchips, LIDAR systems can be incredibly small and inexpensive, without sacrificing loss in performance.

An optical phased array (OPA) is typically used to realize low-cost solid-state LIDARs. Generally, a phased array is an array of unmoving antennas creating light beams which can be steered to point in different directions. In an example, an OPA steers the laser beam by sweeping the optical phase of a phase shifter for each array element. This is accomplished by biasing the voltage or current. However, there are often random phase offsets between phase shifters due to sidewall roughness of waveguides. This necessitates a calibration process for the phase coefficients of the OPA. Further, the phase offsets between the phase shifters may be temperature dependent, and temperature variations throughout the OPA may affect the accuracy of beam steering. Therefore, any universal adjustment in phase coefficients will be ineffective if different temperatures exist at different points in the OPA. Generally, conventional OPAs rely on thermoelectric coolers to stabilize the temperature of the OPA. However, utilizing thermoelectric coolers may lower the overall energy efficiency of the system.

In an example, the present disclosure remedies the above noted deficiencies by utilizing a solid-state LIDAR system where different temperatures in an OPA are compensated for by determining and setting different phase coefficients for different phase shifters affiliated with different antennas of the OPA, which may be dynamically self-calibrated. In an example of the present disclosure, the output of different antennas can be monitored and tracked in order to cancel the phase offset between different array elements in an OPA in real time. By doing so, the solid-state LIDAR system according to one aspect of the present disclosure improves the accuracy and reliability of laser beam steering in solid-state LIDAR systems.

Figure 1:
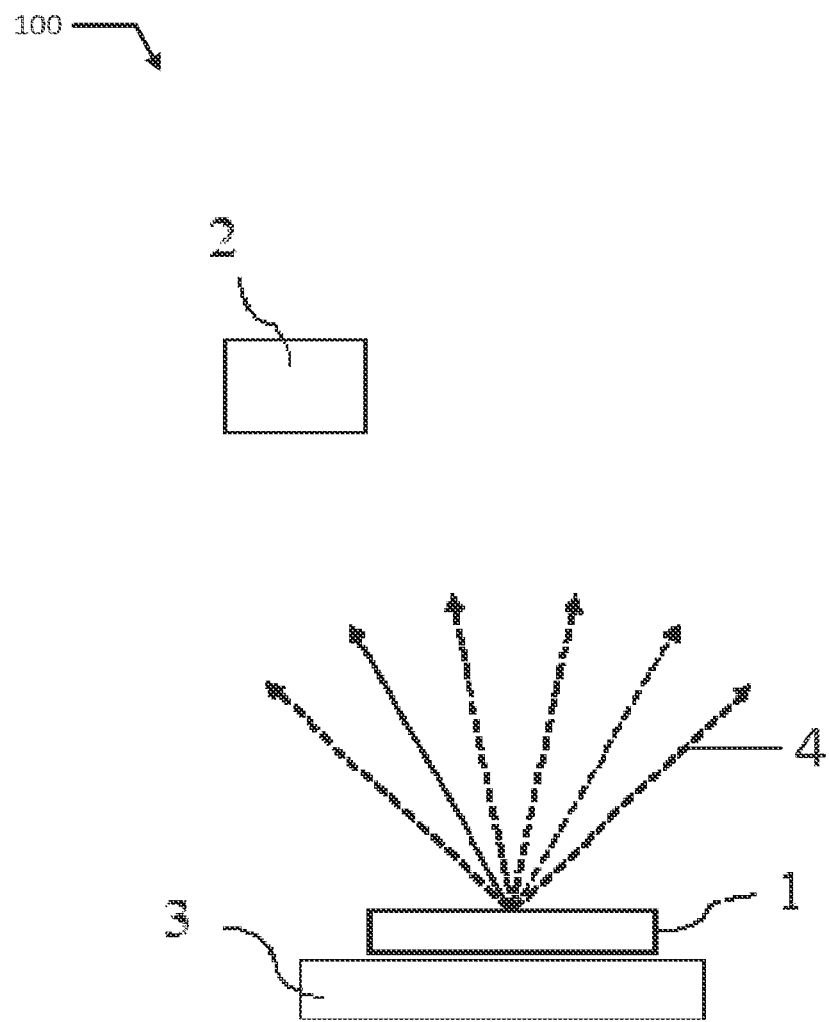
FIG. 1 is a block diagram of a solid-state LIDAR system with real-time self-calibration according to an example of the present disclosure.

FIG. 1 depicts a block diagram from a top-down perspective of a solid-state LIDAR system with real-time self-calibration 100 according to an example of the present disclosure. The system 100 includes a solid-state LIDAR chip 1 attached to a packaging substrate 3. The LIDAR chip or circuit 1 may be a silicon on insulator (SOI) chip. A chip as used herein refers to a circuit such as, for example, an electronic circuit, an integrated circuit, a microchip, a semiconductor fabricated device, etc. The packaging substrate 3 may be made of PCB or ceramic materials. The LIDAR chip 1 and the packaging substrate 3 may be made of any suitable materials, and therefore should not be limited to the materials described herein.

FIG. 1 further depicts a target object 2 located a distance away from the LIDAR chip 1. Directed at the target 2 is a plurality of laser beams 4. Laser beam steering is achieved by an OPA located on LIDAR chip 1. By controlling the phase of the wave emitted from antennas located in the OPA, the OPA is able to steer the direction of the beams emitted. The laser beams formed by the OPA are used for scanning and ranging. The laser beams directed at the target object 2 may bounce off target object 2 and may be reflected back to the LIDAR chip 1. The LIDAR chip 1 obtains the distance information of the target object 2 through frequency-modulated continuous-wave or time-of-flight architectures.

Figure 2:
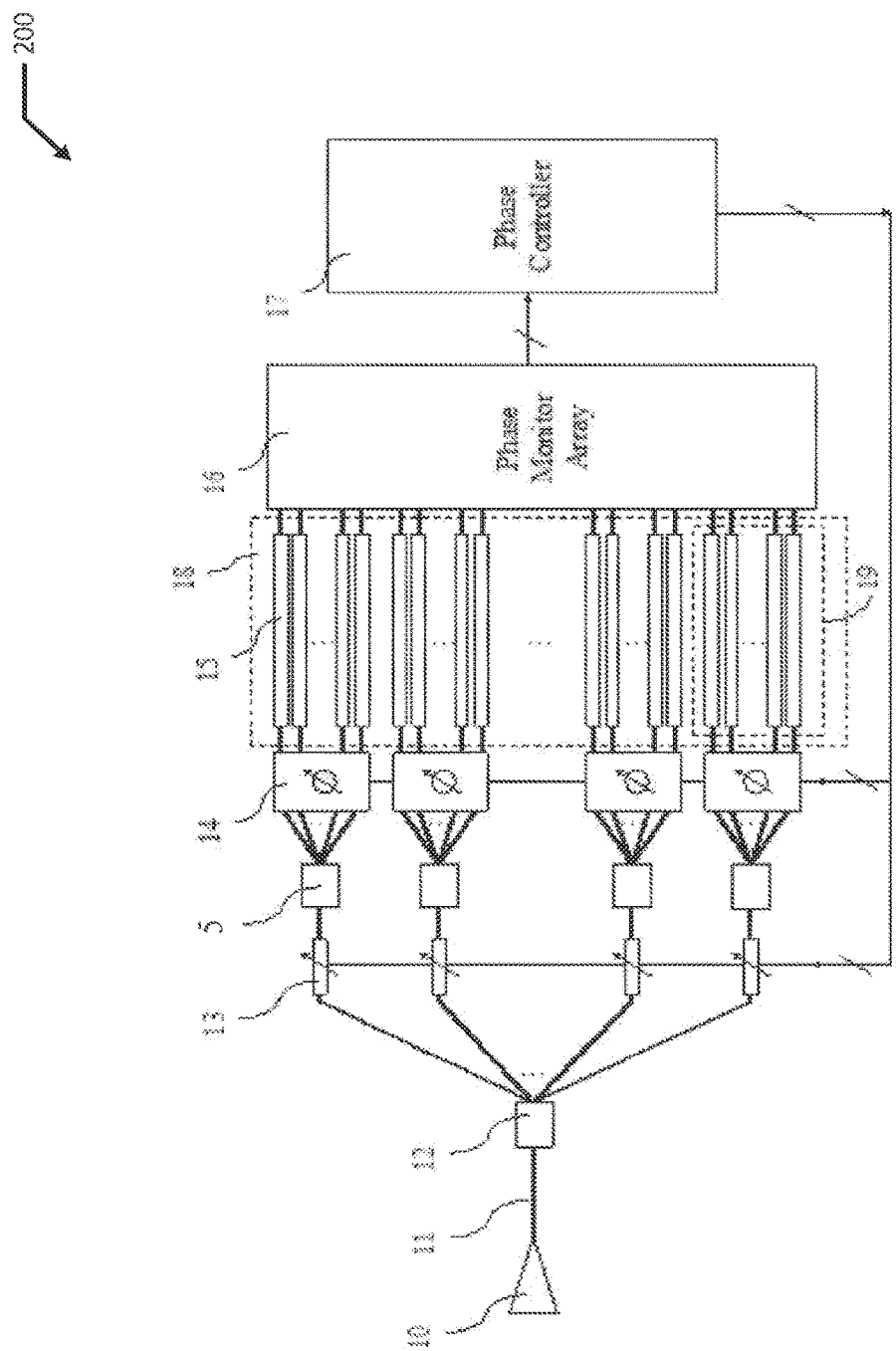
FIG. 2 is system block diagram of a solid-state LIDAR system with real-time self-calibration according to an example of the present disclosure.

FIG. 2 depicts a full system block diagram of a solid-state LIDAR system with real-time self-calibration according to an example of the present disclosure. FIG. 2 depicts an example of a LIDAR chip 200 that includes a fiber-to-chip coupler 10 that couples a laser onto the LIDAR chip 200. In the example, the fiber-to-chip coupler 10 may be a typical coupler, such as a grating coupler or an edge coupler. The optical power produced by the laser may be distributed through on-chip waveguides 11 to the rest of chip 200. Generally, a waveguide structure may guide waves, such as optical waves, and may enable a signal to propagate with minimal loss of energy by restricting expansion to one or two dimensions. In the example, the on-chip waveguide 11 is typically made of silicon, but may be made of any appropriate material. The on-chip waveguide 11 is coupled to a splitter 12. The splitter 12 may also be located on the LIDAR chip 200. The splitter 12 divides/splits the optical power into a plurality of branches. For example, power may be split in a hierarchical tree structure with Y splitters or MMI splitters. The splitting ratio of power between each branch may be the same between all branches. In an alternative example, power may be split unequally between the branches.

After being divided, the divided power may be routed through a global phase shifter 13. Each branch of divided power from the splitter 12 may be connected to a global phase shifter 13 as depicted in FIG. 2. In an alternate example, each branch from splitter 12 may not be connected to its own global phase shifter 13. The global phase shifter 13 is connected to an on-chip splitter 5 which further sub-divides the divided power. The sub-divided power may be equally split among all the branches being output from on-chip splitter 5. In an alternative example, the sub-divided power may be unequally split among the branches being output from on-chip splitter 5. This on-chip splitter 5 may be similar or identical to the splitter 12. Alternatively, a different type of splitter may be used for on-chip splitter 5 than for splitter 12. For example, the number of ports leaving the splitter 12 may be different than the number of ports leaving the on-chip splitter 5. Further, the splitter 12 or the on-chip splitter 5 may be part of a nested configuration.

In the example, the sub-divided power travels though a phase shifting block or on-chip phase shifter 14. The phase shifting block 14 can be an array of thermally or electrically tunable phase shifters. Generally, thermally tunable phase shifters are more commonly utilized due to a lower loss of optical power, but may operate at a slower rate. Generally, electrically tunable phase shifters may operate more quickly, but may cause extra optical loss. Both types of phase shifters may be utilized for the example disclosure of FIG. 2. In the example, the outputs of the phase shifting block 14 are connected to antennas 15 of an OPA 18.

The OPA 18 is comprised of subarrays 19. There can be one subarray 19 or a plurality of subarrays 19, depending on the application and/or the number of antennas 15 in the OPA 18. The sub-arrays 19 may include a plurality of optical antennas 15. The number of subarrays 19 and antennas 15 may be more or less than those depicted in FIG. 2, as indicated by the vertical ellipses in the OPA 18. Each sub-array 19 may contain between 2 and 100 antennas. In an example, the subarrays 19 may further include the on-chip splitting block 5 and the phase shifting block 14 along with antennas 15. The subarrays 19 and optical antennas 15 together may form the OPA 18 for laser beam forming and steering. The laser steering angle is determined by the optical phase difference between antennas 15. The phase shifting block 14 sets phase difference between antennas 15 in one antenna subarray 19, while the global phase shifters 13 can further tune the phase difference between subarrays 19.

Residue of the light in the antennas 15 includes information about the optical phase for each antenna 15. The residue of light is a signal sent to a phase monitor array 16, and is used to sense the optical phases of light at the ends of antennas 15. Therefore, in this example, a portion of light is not emitted from antenna 15 and may remain in antenna 15 to be detected by, or travel to, phase monitor array 16. In the example, if too little light remains the residue of light may not be detected by the phase monitor array 16. In this example, the antennas may be configured in a way that not all the light is emitted from antennas 15. This may be done, in an example, by making the antennas 15 shorter. Alternate antenna design methods may be utilized in choosing how much light to emit or not emit from antennas 15. Based on this phase information in the residue of light, a phase controller 17 may be used to control the phase shifters 13 and 14 in the OPA adaptively to maintain the required phase relations between the antennas. Data, information or signals are sent from the phase controller 17 to the phase shifting block 14, and the phase shifting block 14 sets phase difference between antennas 15 in one antenna subarray 19. Data, information, or signals are sent from phase controller 17 to the global phase shifter 13, where the global phase shifters 13 can further tune the phase difference between subarrays 19.

Figure 3:
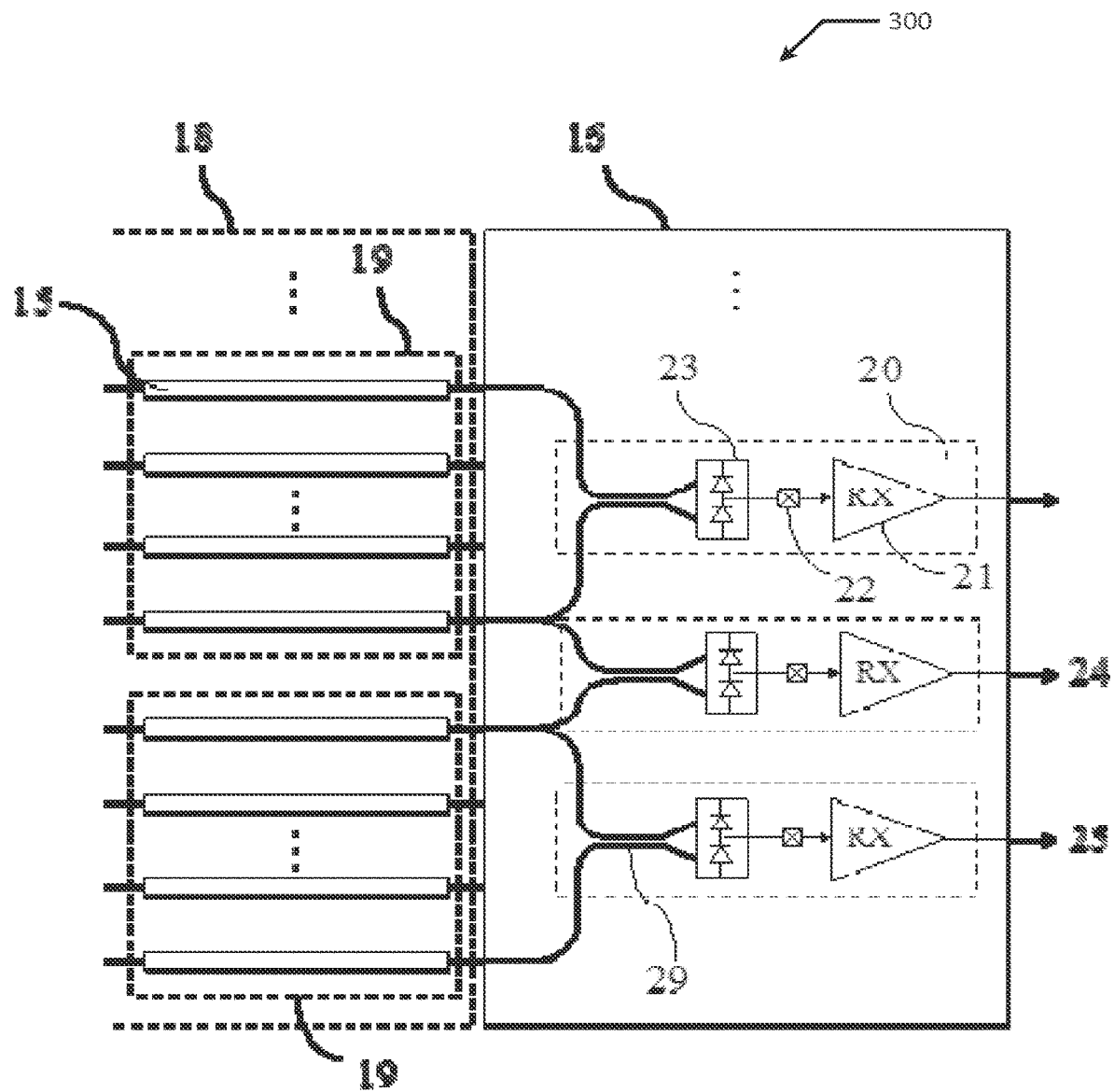
FIG. 3 is a block diagram of a phase monitor array of a solid-state LIDAR system with real-time self-calibration according to an example of the present disclosure.

FIG. 3 is a block diagram of a phase monitor array of a solid-state LIDAR system with real-time self-calibration 300 according to an example of the present disclosure. The phase monitor array system 300 includes a phase monitor array 16 and an OPA 18. OPA 18 includes a plurality of subarrays 19. Each subarray 19 includes a plurality of antennas 15. The system 300 depicts two antennas 15 from each subarray coupled to a coherent detection block or circuit 20, which may detect the phase difference between the two antennas. Generally, when detecting the phase difference within one antenna subarray 19, the two farthest antennas 15 may be compared in order to maximize the sensed phase difference due to temperature variation within the subarray 19. However, any two antennas 15 within the subarray 19 may be coupled to coherent detection block 20. The coherent detection block consists of a 2×2 coupler 29, a balanced photodetector 23 and a receiver circuit 21. Although depicted as a balanced photodetector 23, in an alternate example, the photodetector 23 may be a single diode photodetector. However, utilizing a balanced photodetector 23 is preferred. The output of the balanced photodetector 23 may be connected to the input of a receiver circuit 21 through a connection 22. The connection 22 may be a micro bump, or copper pillars in the case of 3D integration. A subarray phase difference signal or mixed signal 25 carrying information about the phase difference within the subarray 19 is passed to the phase controller 17.

Similarly, one antenna from a first subarray of the subarrays 19 and another antenna from a second subarray of the subarrays 19 are coupled to another depicted coherent detection block 20 (the middle one). The phase difference between the two adjacent subarrays can be sensed and the resultant phase difference signal or sub-array mixed signal 24 is sent to the phase controller 17. The coherent detection blocks 20 may be identical.

Figure 4:
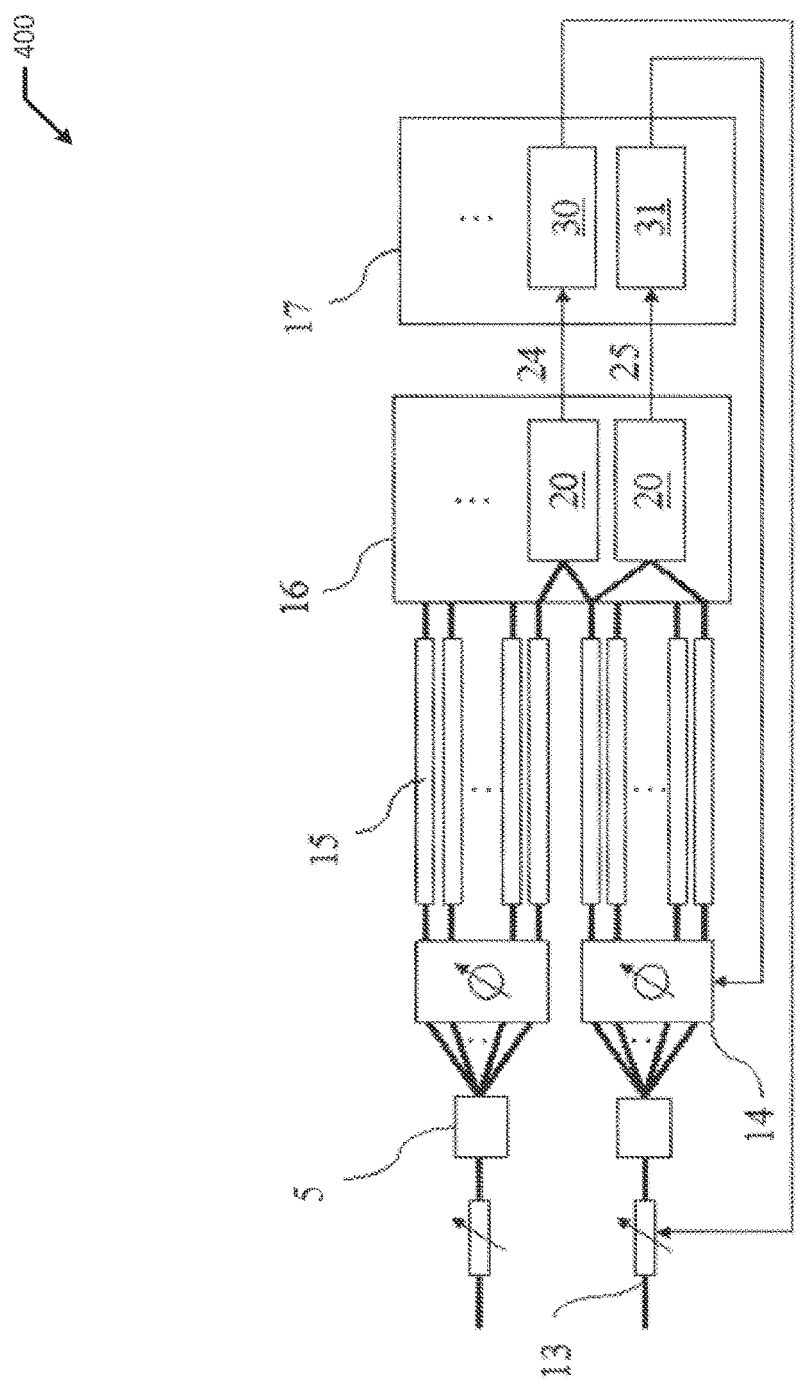
FIG. 4 is a block diagram of a feedback loop for a solid-state LIDAR system with real-time self-calibration according to an example of the present disclosure.

FIG. 4 is a block diagram of a feedback loop for a solid-state LIDAR system with real-time self-calibration according to an example of the present disclosure. Feedback loop 400 depicts a global phase shifter 13 connected to an on-chip splitter 5. As depicted by the vertical ellipses between the outputs of the on-chip splitter 5, the on-chip splitter 5 may contain more or less outputs than those depicted. The outputs of the on-chip splitter 5 are connected to antennas 15. As depicted by the vertical ellipses between antennas 15, there may be more or less antennas than those depicted. The antennas 15 are connected to phase monitor array 16, or directly connected to coherent detection block 20 within phase monitor array 16. As depicted by the vertical ellipses, there may be more or less detection blocks 20. Coherent detection block 20 may include waveguides, directional couplers or MMI couplers.

In the example, two antennas 15 within the same subarray are connected to the lower depicted coherent detection block 20, while two antennas 15 from different subarrays are connected to the top coherent detection block 20. The outputs from the detection blocks 20 may include sub-array mixed signal 24 and antenna mixed signal 25. Subarray mixed signal 24 represents a combined signal or output from the two antennas 15 from different sub-arrays. This sub-array mixed signal 24 is processed by processing block 30 in the phase controller 17. The processing block 30 or phase controller 17 determines a coefficient that will adjust the global phase shifter 13, and outputs a command to the global phase shifters 13 to adjust the phase coefficient. If more than one global phase shifter is used, each global phase shifter 13 may receive a different phase coefficient to adjust the phase of the antennas 15. The controller 30 sets the phase coefficient for global phase shifter 13 based on the monitored phase difference between adjacent subarrays. Processing blocks 30 and 31 may be two different controllers 30 and 31 respectively in the phase controller 17.

Antenna mixed signal 25 represents the combined signal or output from two antennas 15 in the same subarray. The mixed signal 25 is processed by processing block 31 in phase controller 17. The processing block 31 or the phase controller 17 determines a coefficient that will adjust the on-chip phase shifter 14, and outputs a command. If more than one on-chip phase shifter 14 is used, each on-chip phase shifter 14 may receive a different phase coefficient to adjust the phase of the antennas. The controller 31 may set the phase coefficients for the phase shifting block 14 for each sub-array.

A controller 30 or 31, or phase controller 17, may include a processor. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, one or more physical processors may be in the system 300. In an example, all of the disclosed methods and procedures described herein can be implemented by the one or more processors.

Phase controller 17 or controllers 30 and 31 may include a memory device. A memory device refers to a volatile or non-volatile memory device, such as RAM, ROM, EEPROM, or any other device capable of storing data. The phase controller 17 may further include a transimpedence amplifier (TIA), analog to digital converter (ADC), and phase shifter driver. A combination of these components may be used to convert the signal from the optical domain in to the electrical domain. The phase controller 17 may be a system of a chip (SoC).

Figure 5:
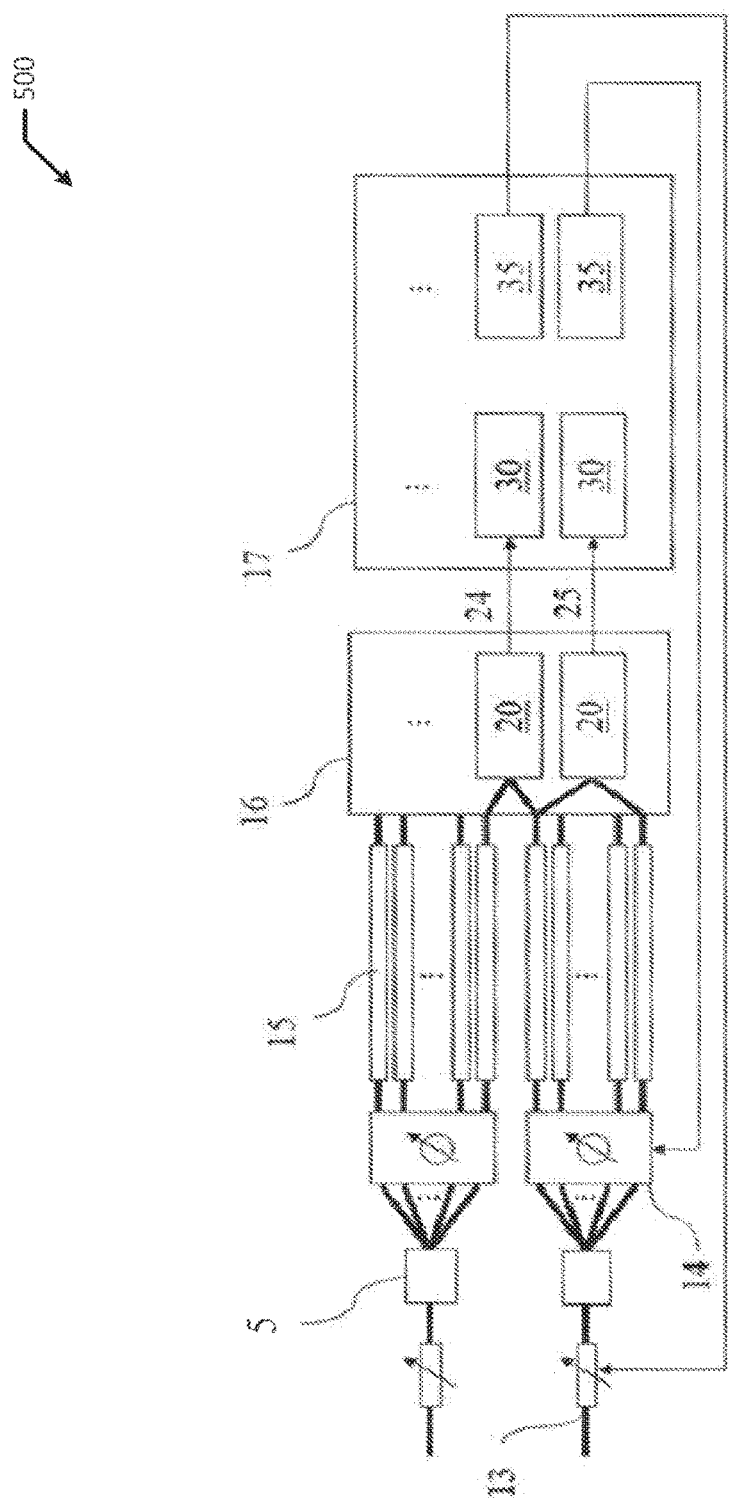
FIG. 5 is a block diagram of a feedback loop for a solid-state LIDAR system with real-time self-calibration according to an example of the present disclosure.

FIG. 5 discloses a block diagram of a feedback loop for a solid-state LIDAR system with real-time self-calibration according to an example of the present disclosure. The feedback loop 500 may be similar to the feedback look 400 described in FIG. 4, however, an alternative example of the phase controller 17 and its components are presented. For example, phase controller 17 may include two controllers 30, rather than two controllers 30 and 31 as in FIG. 4. In this example, both the subarray mixed signal 24 and mixed signal 25 may be processed by the same type of processing block 30. In this example, processing block 30 may be an analog frontend component including a TIA and an ADC. The phase shifter driver 35 may be a component of phase controller 17 separate from the TIA and ADC. Further in this example, the phase controller 17 may be a system of a chip (SoC).

Reference coefficients may be generated through an initial calibration process and stored in the computer memory as a look-up table (LUT). These coefficients are given to controllers for various beam steering angles. Interpolation can be done in the digital domain to generate new references for different angles.

The antennas 15 in one subarray 19 may be any number ranging from between 2 to 100. If the subarray is too large, phase monitoring is not efficient as the temperature variation within the subarray may become too large. Phase monitoring may occur within one subarray where the temperature variation is small, so the phase coefficients may be properly calculated.

In an alternate example, the antennas 15 may not be arranged into subarrays 19. Subarrays 19 are used in large systems in order to provide a modular design, where each feedback loop for each subarray 19 may be identical for manufacturing ease. Alternatively, the feedback loops may not be identical depending on the purpose of each feedback loop. The size of the OPA will affect the number of feedback loops implemented. For example, in a small OPA, there may be no need for a subarray or multiple coherent detection blocks 20, as only a few antennas exist in the OPA. In such a case, only one feedback loop may be implemented. Alternatively, a large OPA may implement thirty subarrays and a large number of coherent detection blocks. There is no limit to the number of subarrays or feedback loops that may be implemented.

Figure 6:
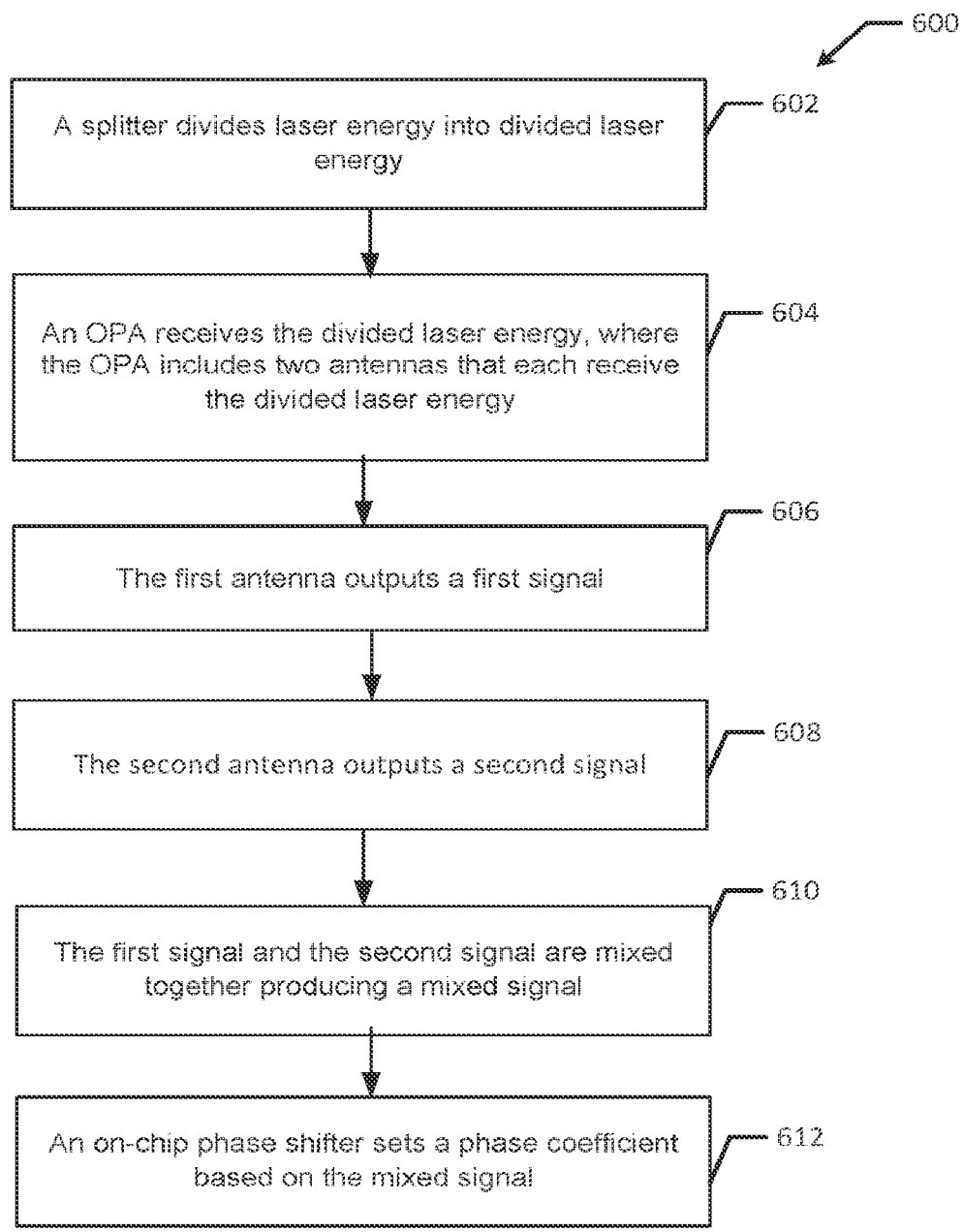
FIG. 6 is a flowchart illustrating an example method for using a solid-state LIDAR system with real-time self-calibration.

FIG. 6 is a flowchart illustrating an example method for using a solid-state LIDAR system with real-time self-calibration. Although the example method 600 is described with reference to the flowchart illustrated in FIG. 6, it will be appreciated that many other methods of performing the acts associated with the method may be used. For example, the order of some of the blocks may be changed, certain blocks may be combined with other blocks, and some of the blocks described are optional.

The method 600 begins when a splitter divides laser energy into divided laser energy (block 602). For example, in FIG. 2, splitter 12 receives energy emitted from a laser coupled to the chip 200 through coupler 10, and transmitted through waveguide 11. The splitter 12 may divide the laser power equally or unequally into a plurality of branches that are output from the splitter 12. In an example, the energy may be divided by only one splitter, such as splitter 12. In an alternate example, the laser energy may be divided by multiple splitters such as splitter 12 and splitting block 5 to create sub-divided laser energy. Further, in an alternate example, the branches of the outputs of splitter 12 or splitting block 5 may further comprise nested splitting configurations/branches and the energy may be further sub-divided.

Next, an OPA receives the divided laser energy, where the OPA includes two antennas that each receives the divided laser energy (block 604). For example, the divided laser energy may be received by the antennas 15 in the OPA 18. The antennas 15 may be configured into subarrays 19.

Next, a first antenna outputs a first signal (block 606), and a second antenna outputs a second signal (block 608). In an example, the antennas 15 in the OPA 18 output signals. The first antenna and second antenna may output the first and second signals simultaneously. In an alternative example, the first and second signals may be output sequentially.

Next, the first signal and second signal are mixed together producing a mixed signal (block 610). For example, the output signals may be sent to phase monitor array 16, or directly to coherent detection block 20, in FIG. 4 and the signals may be combined producing a mixed signal 24. Depending on the differences in phase of the first signal and the second signal, the mixed signal 24 will provide information on the phase difference of energy emitted by the two antennas to the phase controller 17 and the components of phase controller 17 may determine a phase coefficient that may correct the phase offset between the first and second antennas.

Last, an on-chip phase shifter sets a phase coefficient based on the mixed signal (block 612). For example, based on the mixed signal 24, the phase controller 17 and its components 30 and 31 in FIG. 4 will determine what phase coefficient may be applied to correct the phase difference of the frequency produced by the first and second antenna, and outputs a command to phase shifting block 14. The phase coefficients may be generated through an initial calibration process and stored in the computer memory as a look-up table (LUT). Phase shifting block 14 will automatically apply that phase coefficient in order to adjust beams emitted by the OPA to compensate for temperature variation within the OPA.

Figure 7:
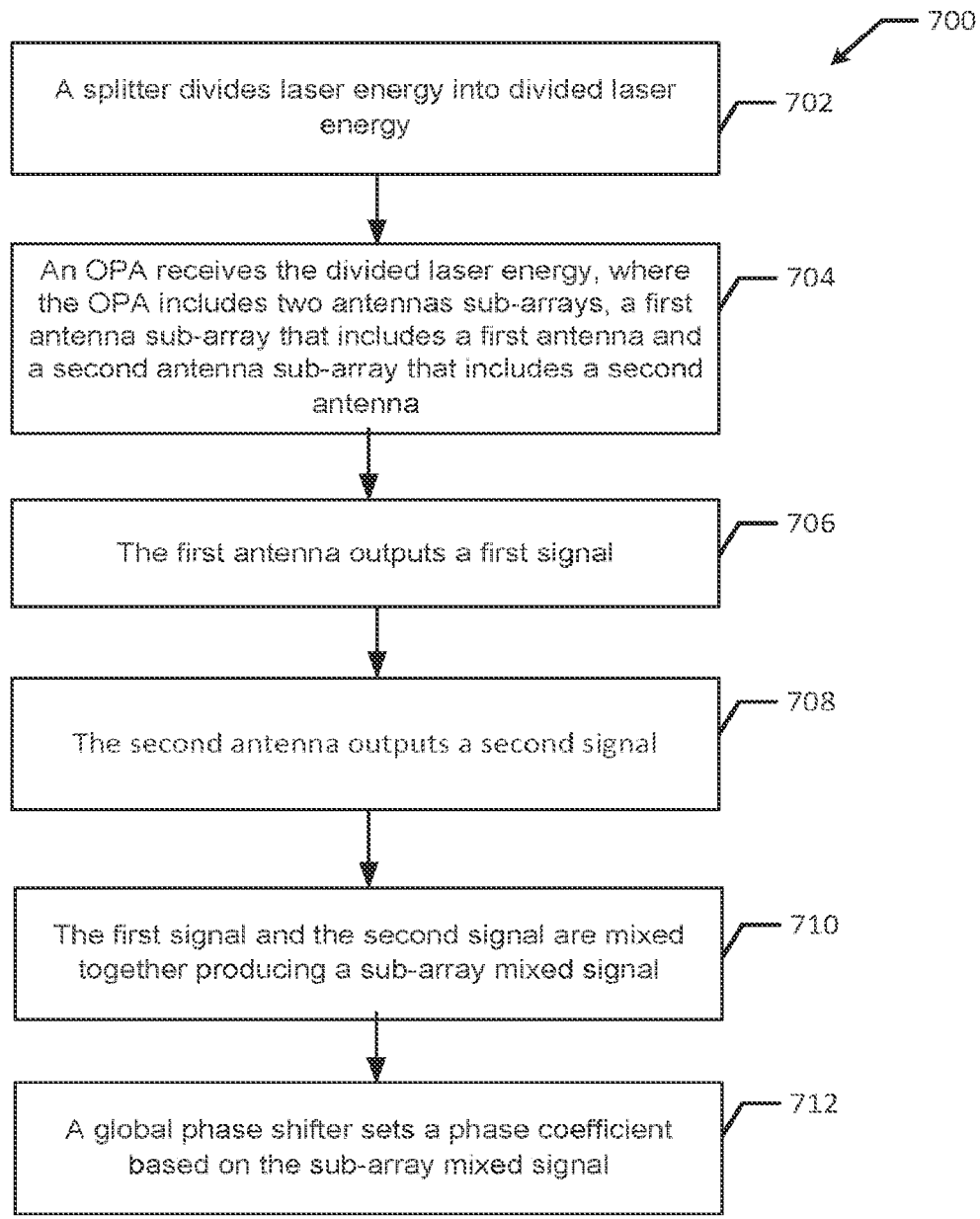
FIG. 7 is a flowchart illustrating an example method for using a solid-state LIDAR system with real-time self-calibration.

FIG. 7 is a flowchart illustrating an example method for using a solid-state LIDAR system with real-time self-calibration. Although the example method 700 is described with reference to the flowchart illustrated in FIG. 7, it will be appreciated that many other methods of performing the acts associated with the method may be used. For example, the order of some of the blocks may be changed, certain blocks may be combined with other blocks, and some of the blocks described are optional.

The method 700 begins when a splitter divides laser energy into divided laser energy (block 702). For example, in FIG. 2, splitter 12 would receive energy emitted from a laser coupled to the chip 200 through coupler 10, and transmitted through waveguide 11. The splitter 12 would divide the laser power equally or unequally into a plurality of branches that are output from the splitter 12. In an example, the energy may be divided by only one splitter, such as splitter 12. In an alternate example, the laser energy may be divided by multiple splitters such as splitter 12 and splitting block 5 to create sub-divided laser energy. Further, in an alternate example, the branches of the outputs of splitter 12 or splitting block 5 may further comprise nested splitting configurations/branches and the energy may be further sub-divided.

Next, an OPA receives the divided laser energy, where the OPA includes two antennas sub-arrays, a first antenna subarray that includes a first antenna and a second antenna sub-array that includes a second antenna (block 704). For example, the divided laser energy is received by a first antenna in a first antenna sub-array of the plurality of sub-arrays 19, and a second antenna in a second sub-array of the plurality of sub-arrays 19 of OPA 18.

Next, a first antenna outputs a first signal (block 706), and a second antenna outputs a second signal (block 708). In an example, the antennas 15 in OPA 18 output signals. The first antenna is from the first sub-array and outputs the first signal, and second antenna is from the second sub-array and may output the second signal. The signals may be output simultaneously. In an alternative example, the first and second signals may be output sequentially.

Next, the first signal and second signal are combined together producing a sub-array mixed signal (block 710). For example, the output signals may be sent to phase monitor array 16, or directly to coherent detection block 20, in FIG. 4 and the signals are mixed together producing a sub-array mixed signal 25. Depending on the differences in phase of the first signal and the second signal, the sub-mixed signal 25 will provide information on the phase difference between the two antenna sub-arrays to the phase controller 17 and the components of phase controller 17 which will determine the phase coefficient that may correct the phase offset between the first and second sub-arrays.

Last, a global shifter sets a phase coefficient based on the sub-array mixed signal (block 712). For example, based on the sub-array mixed signal 25, the phase controller 17 and its components 30 and 31 in FIG. 4 will determine what phase coefficient may be applied and outputs a command to global phase shifter 13. Global phase shifter 13 will automatically apply that phase coefficient in order to adjust beams emitted by the OPA to compensate for temperature variation within the OPA and tune the phase differences between the sub-arrays.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A light detection and ranging system, comprising:
   a solid-state optical antenna array comprising a plurality of optical antenna subarrays;
   a phase monitor array coupled to the solid-state optical antenna array and configured to output:
      a first mixed signal comprising first and second signals associated with a first one of the optical antenna subarrays; and
      a second mixed signal comprising the second signal and a third signal associated with a second one of the optical antenna subarrays;
   a phase controller coupled to the phase monitor array and configured to output:
      a first phase coefficient based on the first mixed signal; and
      a second phase coefficient based on the second mixed signal;
   a plurality of phase shifters coupled to inputs of the solid-state optical antenna array, wherein a first one of the phase shifters is configured to apply the first phase coefficient to compensate for temperature variation within the first one of the optical antenna subarrays; and
   a global phase shifter configured to apply the second phase coefficient to compensate for temperature variation between the first one and the second one of the optical antenna subarrays.

2. The light detection and ranging system of claim 1, wherein each of the optical antenna subarrays comprises a plurality of optical antennas.

3. The light detection and ranging system of claim 1, wherein:
   the first signal is associated with a first optical antenna of the first one of the optical antenna subarrays;
   the second signal is associated with a second optical antenna of the first one of the optical antenna subarrays; and
   the third signal is associated with a first optical antenna of the second one of the optical antenna subarrays.

4. The light detection and ranging system of claim 3, wherein the phase monitor array is further configured to output different first phase coefficients associated with different ones of the optical antenna subarrays.

5. The light detection and ranging system of claim 1, wherein the phase monitor array comprises a plurality of coherent detection circuits, wherein:
   a first one of the coherent detection circuits is coupled to the first one of the optical antenna subarrays;
   a second one of the coherent detection circuits is coupled to the second one of the optical antenna subarrays; and
   a third one of the coherent detection circuits is coupled to the first and second ones of the optical antenna subarrays.

6. The light detection and ranging system of claim 5, wherein at least one of the coherent detection circuits comprises:
   a photodetector; and
   an output circuit coupled to the photodetector.

7. The light detection and ranging system of claim 1, wherein the phase controller comprises at least one of the following:
   a processor;
   a memory device;
   an analog-to-digital converter;
   a transimpedance amplifier; and
   a phase shifter driver.

8. The light detection and ranging system of claim 1, wherein the phase controller is further configured to output a third phase coefficient based on a third mixed signal comprising fourth and fifth signals associated with a third one of the optical antenna subarrays.

9. The light detection and ranging system of claim 8, wherein:
   the fourth signal is associated with a first optical antenna of the third one of the optical antenna subarrays; and
   the fifth signal is associated with a second optical antenna of the third one of the optical antenna subarrays.

10. The light detection and ranging system of claim 1, further comprising a plurality of splitters coupled to outputs of the global phase shifter and inputs of the plurality of phase shifters.

11. A light detection and ranging system, comprising:
    a solid-state optical antenna array comprising a plurality of optical antenna subarrays; and
    a self-calibration system coupled to the solid-state optical antenna array, wherein the self-calibration system is configured to compensate for temperature variation between the optical antenna subarrays and comprises:

a phase monitor array coupled to the solid-state optical antenna array and configured to output:
- a first mixed signal comprising first and second signals associated with a first one of the optical antenna subarrays; and
- a second mixed signal comprising the second signal and a third signal associated with a second one of the optical antenna subarrays;

a phase controller coupled to the phase monitor array and configured to output:
- a first phase coefficient based on the first mixed signal; and
- a second phase coefficient based on the second mixed signal;

a plurality of phase shifters coupled to inputs of the solid-state optical antenna array, wherein a first one of the phase shifters is configured to apply the first phase coefficient to compensate for temperature variation within the first one of the optical antenna subarrays; and a global phase shifter configured to apply the second phase coefficient to compensate for temperature variation between the first one and the second one of the optical antenna subarrays.

12. The light detection and ranging system of claim 11, wherein each of the optical antenna subarrays comprises a plurality of optical antennas.

13. The light detection and ranging system of claim 11, wherein:
the first signal is associated with a first optical antenna of the first one of the optical antenna subarrays; and
the second signal is associated with a second optical antenna of the first one of the optical antenna subarrays.

14. The light detection and ranging system of claim 13, wherein the third signal is associated with a first optical antenna of the second one of the optical antenna subarrays.

15. The light detection and ranging system of claim 14, wherein the phase controller is further configured to output a third phase coefficient based on a third mixed signal comprising fourth and fifth signals associated with a third one of the optical antenna subarrays.

16. The light detection and ranging system of claim 15, wherein the global phase shifter is further configured to compensate for temperature variation between the second one and the third one of the optical antenna subarrays based on the third phase coefficient.

17. A light detection and ranging system, comprising:
a solid-state optical antenna array comprising:
- a plurality of splitters;
- a plurality of phase shifters;
- a plurality of optical antenna subarrays; and
- a self-calibration system coupled to the solid-state optical antenna array, wherein the self-calibration system is configured to compensate for temperature variation within the optical antenna subarrays and between the optical antenna subarrays, wherein the self-calibration system comprises:

means for detecting phase information associated with the optical antenna subarrays;

a phase controller for determining a first phase difference of light associated with a first optical antenna of a first one of the optical antenna subarrays and light associated with a second optical antenna of the first one of the optical antenna subarrays;

means for determining a second phase difference of the light associated with the second optical antenna of the first one of the optical antenna subarrays and light associated with a third optical antenna of a second one of the optical antenna subarrays;

means for adjusting the first phase difference to compensate for temperature variation within the first one of the optical antenna subarrays; and a global phase shifter for adjusting the second phase difference to compensate for temperature variation between the first and second ones of the optical antenna subarrays.

18. The light detection and ranging system of claim 17, wherein the means for detecting phase information comprises coherent detector circuits.

19. The light detection and ranging system of claim 17, wherein each of the optical antenna subarrays comprises a plurality of optical antennas.

20. The light detection and ranging system of claim 17, wherein the phase controller comprises at least one of the following:
a processor;
a memory device;
an analog-to-digital converter;
a transimpedance amplifier; and
a phase shifter driver.

* * * * *